United States Patent
Ko et al.

(10) Patent No.: US 11,230,079 B2
(45) Date of Patent: Jan. 25, 2022

(54) HIGH PRESSURE BARREL

(71) Applicant: Neo Mechanics Limited, Hong Kong (HK)

(72) Inventors: Stanley Moon Kai Ko, Hong Kong (HK); Kyong Tae Chang, Seoul (KR)

(73) Assignee: Neo Mechanics Limited, Hong Kong (HK)

( * ) Notice: Subject to any disclaimer, the term of this patent is extended or adjusted under 35 U.S.C. 154(b) by 242 days.

(21) Appl. No.: 16/297,652

(22) Filed: Mar. 9, 2019

(65) Prior Publication Data

US 2020/0282682 A1    Sep. 10, 2020

(51) Int. Cl.
*B30B 15/02* (2006.01)
*B30B 15/28* (2006.01)
(Continued)

(52) U.S. Cl.
CPC .............. *B30B 15/02* (2013.01); *B30B 15/28* (2013.01); *F04B 53/143* (2013.01); *F04B 53/162* (2013.01)

(58) Field of Classification Search
CPC ....... B30B 15/02; B30B 15/06; B30B 15/065; B30B 15/28; B30B 9/3021; B30B 9/3042; B30B 11/02; F15B 15/14; F15B 15/1452; F15B 15/20; F04B 53/162; F04B 53/02; F04B 53/143; F16J 15/16
See application file for complete search history.

(56) References Cited

U.S. PATENT DOCUMENTS

| | | | | |
|---|---|---|---|---|
| 5,440,183 A | * | 8/1995 | Denne | ..................... F15B 15/00 310/12.26 |
| 7,980,158 B1 | * | 7/2011 | Centrella | .............. B30B 15/065 76/107.1 |

(Continued)

FOREIGN PATENT DOCUMENTS

CN    201347922 Y    11/2009
CN    203051298 U    7/2013
(Continued)

OTHER PUBLICATIONS

International Search Report and Written Opinion of corresponding PCT Patent Application No. PCT/IB2020/051831 dated Jun. 15, 2020.

*Primary Examiner* — Jimmy T Nguyen
(74) *Attorney, Agent, or Firm* — Idea Intellectual Limited; Margaret A. Burke; Sam T. Yip

(57) ABSTRACT

The present invention provides a high-pressure piston-cylinder assembly for compaction treatment comprising a cylinder comprising a plurality of sections which are longitudinally stacked and joined to form the cylinder; a piston configured for moving in and along the cylinder; and a base configured for being coupled with the cylinder to provide mechanical support to the cylinder; wherein each of the sections includes one or more releasing channels for releasing of liquid or gas fluid generated during compaction treatment. The high-pressure piston-cylinder assembly is sealed by one seal having a helical coiled sealing ring structure tightly encircling the piston, and another seal encircling a cylindrical sealing block protruded from the base and into the cylinder. The resulting piston-cylinder assembly can be more effectively manufactured, has better durability and tolerance in high-pressure operation.

9 Claims, 23 Drawing Sheets

(51) Int. Cl.
    *F04B 53/14*         (2006.01)
    *F04B 53/16*         (2006.01)

(56)               References Cited

U.S. PATENT DOCUMENTS

2008/0053306 A1*   3/2008   Lofink ............... F15B 15/1452
                                                                                                92/172
2012/0216673 A1*   8/2012   Chang ................ F16J 15/3272
                                                                                                92/165 R
2013/0113165 A1*   5/2013   Sueyoshi ............. F16J 15/166
                                                                                               277/449
2017/0227026 A1    8/2017   Chaudhary et al.

FOREIGN PATENT DOCUMENTS

CN          103917809 A     7/2014
CN          104196824 A    12/2014
CN          204300029 U     4/2015

* cited by examiner

HIGH PRESSURE BARREL

CROSS-REFERENCES TO RELATED APPLICATIONS

This application is related to the PCT International Application No. PCT/CN2012/071634 filed Feb. 24, 2012; the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present disclosure relates generally to piston-cylinder technology and more specifically relates to a piston-cylinder mechanical assembly for high-pressure processing.

BACKGROUND OF THE INVENTION

Piston-cylinder technology has been applied in internal combustion engines, hydraulic seals, reciprocating pumps, gas compressors, pneumatic cylinders, and other similar assemblies. A conventional piston-cylinder assembly includes a piston moving in and along a cylinder and is made gas or fluid tight by piston rings.

When use in some applications, such as waste compaction or food processing, the cylinder may be subject to an extreme high pressure. To enhance the pressure capacity, simply increasing the cylinder wall thickness would be ineffective and impractical as at higher values of internal pressure, small increase in pressure requires large increase in wall thickness. One option may include selecting a material of high yield strength for making the cylinder. For example, fabrication of conventional pressure vessels from nickel-based superalloys allows for operation at a maximum temperature of about 550 degrees Celsius and a maximum pressure of about 0.5 GPa. However, nickel-based superalloys are very expensive and are difficult to machine, limiting the maximum practical size and greatly increasing the cost. On the other hand, the piston rings installed around the piston are traditionally rubber O-rings which may result in leakage problem at high internal pressure because the rubber will be squeezed out of gap between the cylinder wall and the piston when exposed to an internal pressure at above 450 Pa. Therefore, it is desirable to have an improved piston-cylinder assembly with enhanced pressure capacity and higher manufacturability.

SUMMARY OF THE INVENTION

It is an objective of the present invention to provide a high-pressure piston-cylinder assembly with enhanced pressure capacity and higher manufacturability which can be fabricated with less costly materials and easier to manufactured. It is a further objective of the present invention to provide piston-cylinder assembly with lesser number of components, improved durability, reduced power loss due to reduced piston-cylinder friction, and significantly reduced leakage.

In accordance with one aspect of the present invention, the high-pressure piston-cylinder assembly, comprising: a cylinder comprising a top section, one or more middle sections and a bottom section which are longitudinally stacked and joined to form the cylinder; a piston configured for moving in and along the cylinder; and a base configured for being coupled with the cylinder to provide mechanical support to the cylinder.

In accordance to another aspect of the present invention, the high-pressure piston-cylinder assembly further comprises one or more coiled felt seals (CFS) having a helical coiled sealing ring structure which allows the CFS to contract when the piston is travelling towards the upper end or lower end of the cylinder and dilate when the piston end is travelling through the middle section of cylinder. Therefore, the tight contact between the CFS and the cylinder interior wall can be sustained during the up-down strokes of the piston in the cylinder and leakage can be reduced to zero or close to zero.

BRIEF DESCRIPTION OF DRAWINGS

The present invention is illustrated by way of example, and not by way of limitation, in the figures of the accompanying drawings in which like reference numerals refer to similar elements and in which.

DETAIL DESCRIPTION

Hereinafter, embodiments of the present invention will be described with reference to the figures. It should be noted that the embodiments described herein are not intended to limit the invention in accordance with the claims, and it is to be understood that each of the elements and combinations thereof described with respect to the embodiments are not strictly necessary to implement the aspects of the present invention. Additionally, well-known elements of the disclosure will not be described in detail or will be omitted so as not to obscure the relevant details of the disclosure.

Figure 1A:
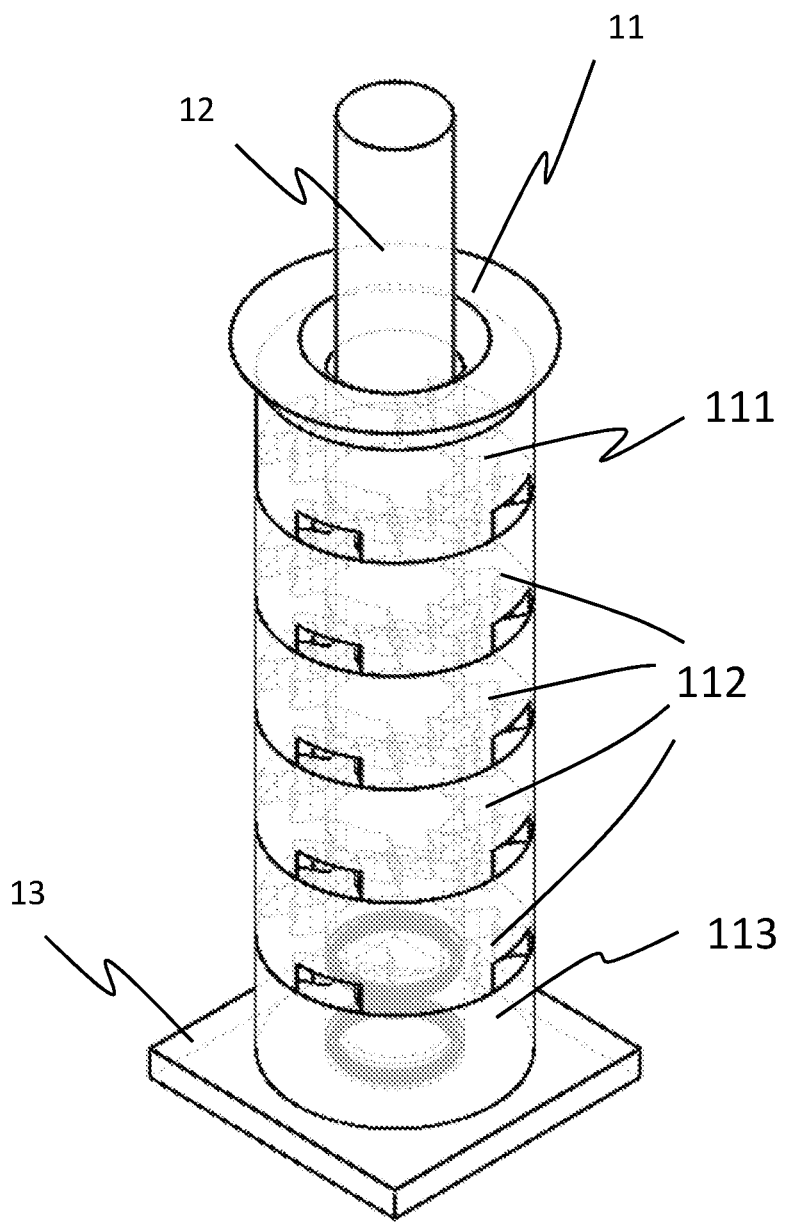
FIG. 1A shows an isometric view of a high-pressure piston-cylinder assembly for compaction treatment in accordance with one embodiment of the present invention.
Figure 1B:
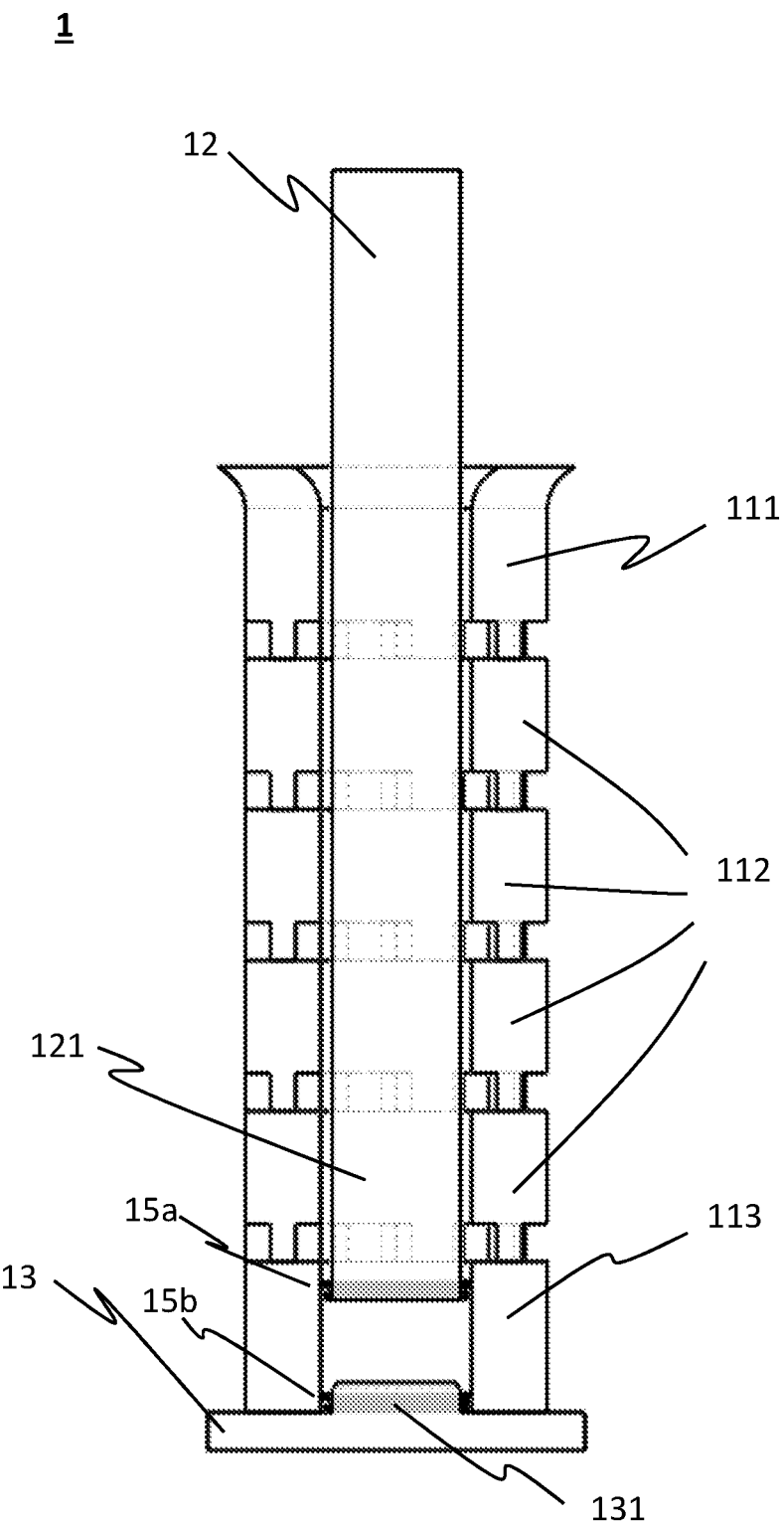
FIG. 1B depicts a sectional view of the high-pressure piston-cylinder assembly as shown in FIG. 1A.

FIGS. 1A and 1B depict an isometric view and a sectional view, respectively, of a high-pressure piston-cylinder assembly 1 for compaction treatment in accordance with one embodiment of the present invention. As show in FIGS. 1A and 1B, the piston-cylinder assembly 1 comprises a cylinder 11 comprising a plurality of sections including a top section 111, one or more middle sections 112 and a bottom section 113 which are longitudinally stacked and joined to form the cylinder; a piston 12 configured for moving in and along the cylinder 11; and a base 13 configured for being coupled with the cylinder to provide mechanical support to the cylinder 11.

Optionally, the top section, middle sections and bottom section may be fixed to each other to form a unitary structure with one or more fixing members (not shown). The fixing members may include bolts configured for engaging with holes formed in each of the cylinder-strengthening members along a longitudinal direction, or metal frames configured to surrounding the cylinder-strengthening members 24 with screws.

Figure 2:
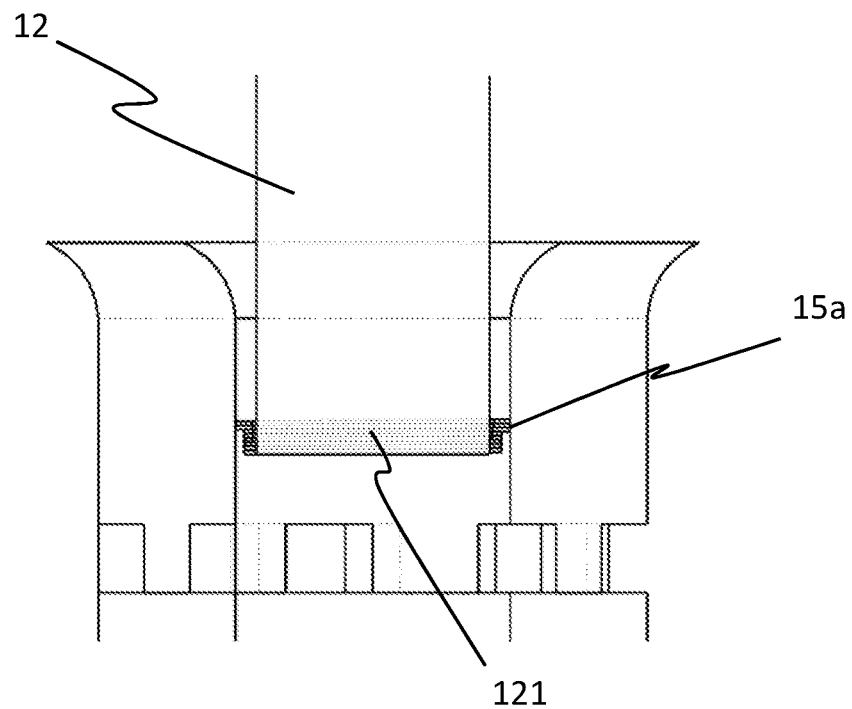
FIG. 2 shows a partial close-up view of the high-pressure piston-cylinder assembly illustrating a lower end of the piston as shown in FIG. 1A.

FIG. 2 shows a partial close-up view of the high-pressure piston-cylinder assembly 1 illustrating a lower end of the piston 12. The piston 12 may have a piston sealing block 121 at its lower end and a first sealing member 15a configured to tightly encircle the piston sealing block 121 for providing sealing function to the piston-cylinder assembly.

Figure 3:
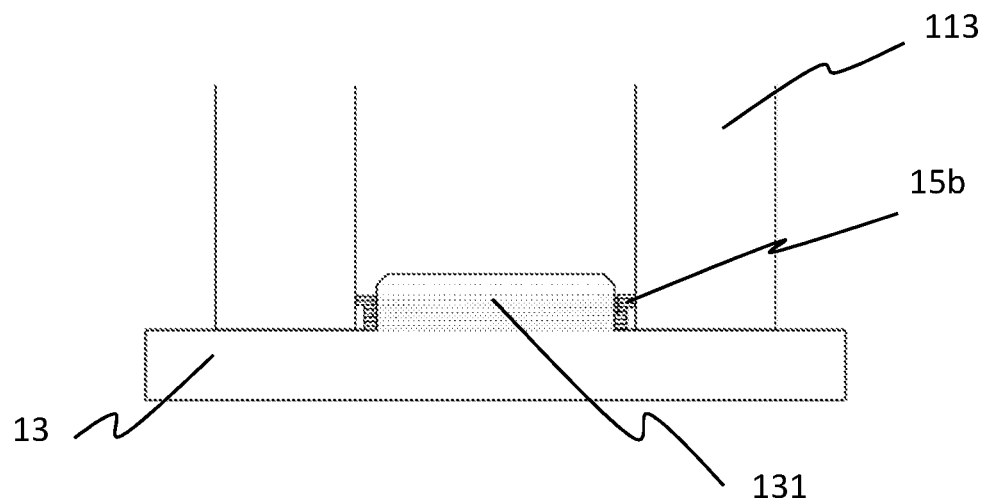
FIG. 3 shows a partial close-up view of the high-pressure piston-cylinder assembly illustrating a center of the base as shown in FIG. 1A.

FIG. 3 shows a partial close-up view of the high-pressure piston-cylinder assembly 1 illustrating a center of the base 13. The base 13 may have a cylindrical sealing block 131 protruded from its center and a second sealing member 15b configured to tightly encircle the cylindrical sealing block 131 for providing sealing function to the piston-cylinder assembly.

Figure 4:
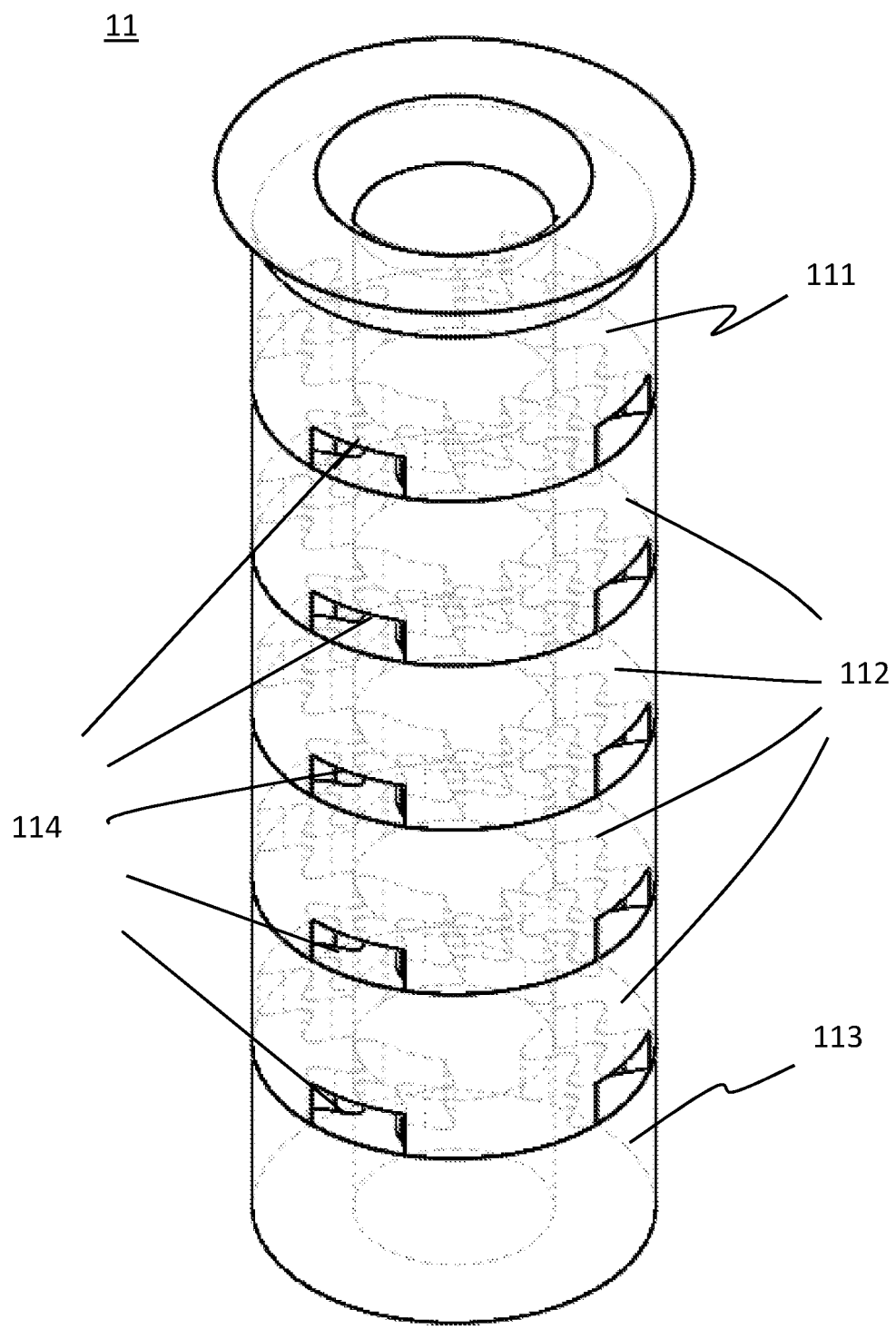
FIG. 4 shows a close-up view of the cylinder as shown in FIG. 1A.

FIG. 4 shows a close-up view of the cylinder 11. The top section 111 and the one or more middle sections 112 may include or more releasing channels 114 for releasing of liquid or gas fluid generated during compaction treatment. The releasing channels 114 may have curved and wavy paths as depicted in this embodiment. In some embodiments, the releasing channels 114 may have straight paths.

Figure 5A:
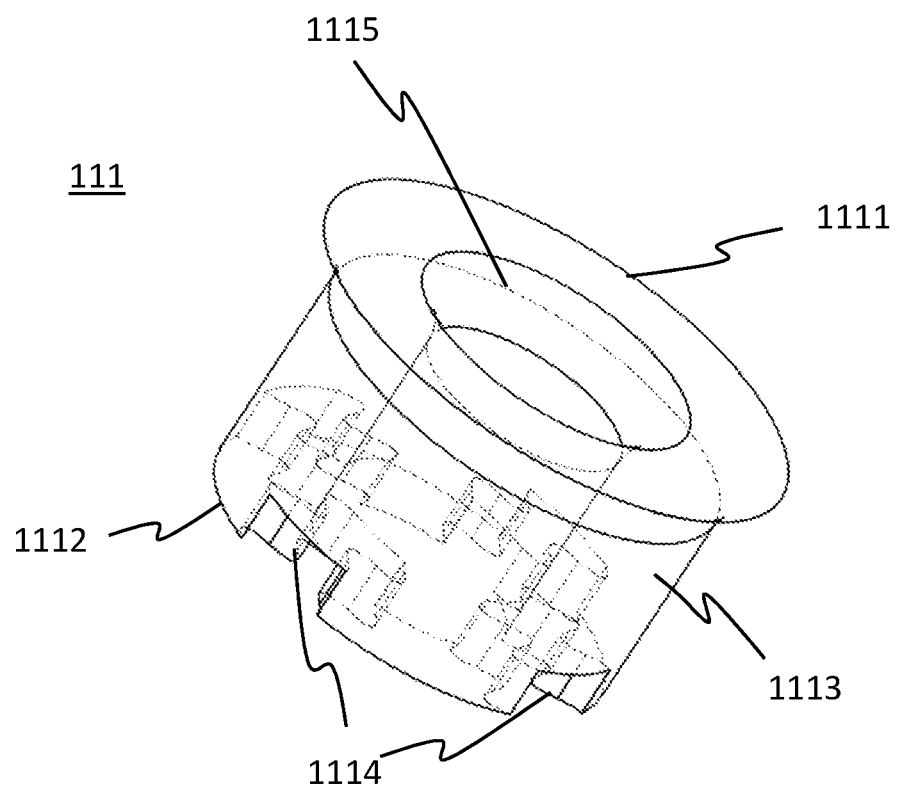
FIG. 5A shows a top section of the high-pressure piston-cylinder assembly as shown in FIG. 1A.

FIG. 5A shows a top section 111 in accordance with one embodiment. The top section 111 may have a top end 1111, a bottom end 1112 spaced apart longitudinally from the top end 1111, and a cylindrical body 1113 connecting the top end and bottom end. The top section may have an opening 1115 which is rounded or chamfered for allowing smooth insertion of the piston sealing block.

Figure 5B:
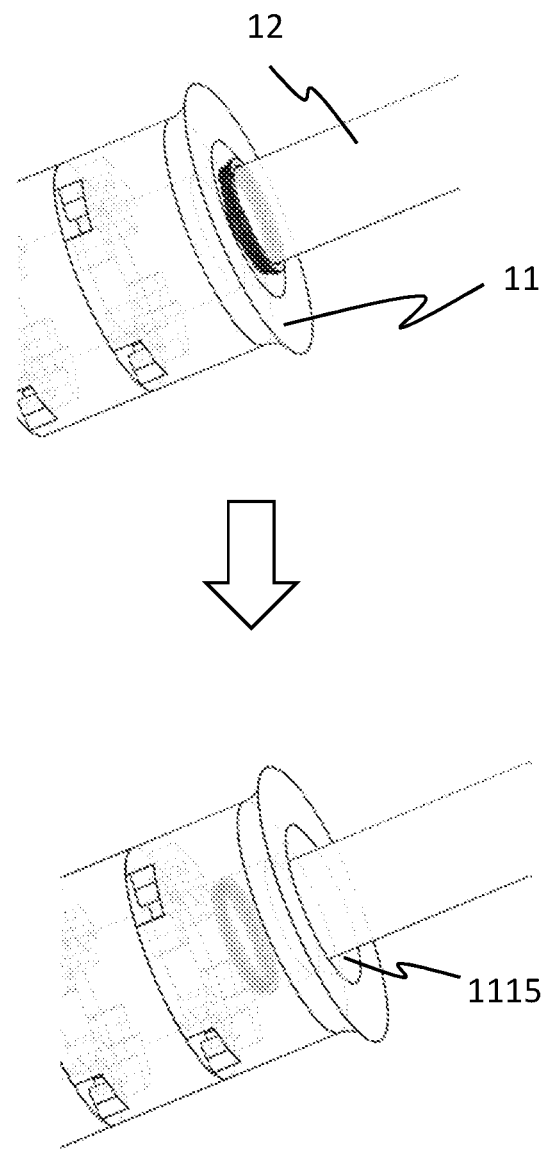
FIG. 5B shows how the piston is guided and inserted into the cylinder as shown in FIG. 1A.

As shown in FIG. 5B, when the piston 12 is inserted into the cylinder, if the center of the piston 12 is initially positioned a bit offset from the center of the cylinder 11, the rounded or chamfered opening 1115 of the cylinder can guide the piston 12 back to an optimal position such that the piston 12 is aligned with the cylinder 11 and smoothly inserted into the cylinder 11.

Returning to FIG. 5A. The top section 111 may further have one or more grooves 1114 positioned at its bottom end and extending substantially along a radial direction through its cylindrical body 1113. When the top section 111 is stacked on and connected with of the middle sections 112 as shown in FIG. 4, the grooves at the bottom end of the top section are coupled with top end of the connected middle section 112 to form the releasing channels 114 for releasing of liquid or gas fluid generated during compaction treatment.

Figure 6:
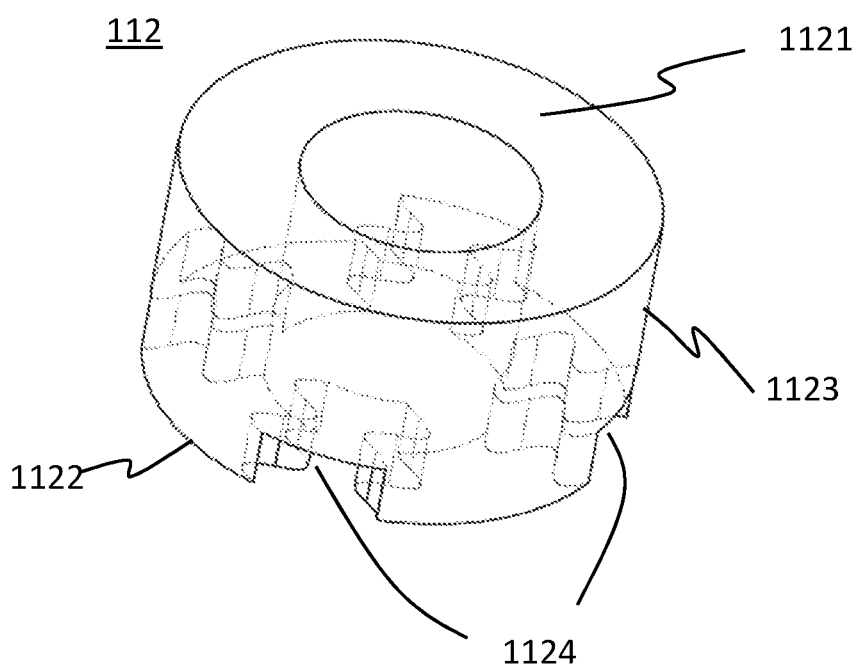
FIG. 6 shows a middle section of the high-pressure piston-cylinder assembly as shown in FIG. 1A.

FIG. 6 shows a middle section 112 in accordance with one embodiment. The middle section 112 may have a top end 1121, a bottom end 1122 spaced apart longitudinally from the top end, and a cylindrical body 1123 connecting the top end and bottom end. The middle section 112 may further have one or more grooves 1124 positioned at its bottom end 1122 and extending substantially along a radial direction through its cylindrical body 1123. When the middle section 112 is stacked on and connected with another middle section or the bottom section 113 as shown in FIG. 4, the grooves 1124 at the bottom end 1122 of the middle section are coupled with top end of the connected middle section or bottom section to form releasing channels 114 for releasing of liquid or gas fluid generated during compaction treatment.

Figure 7:
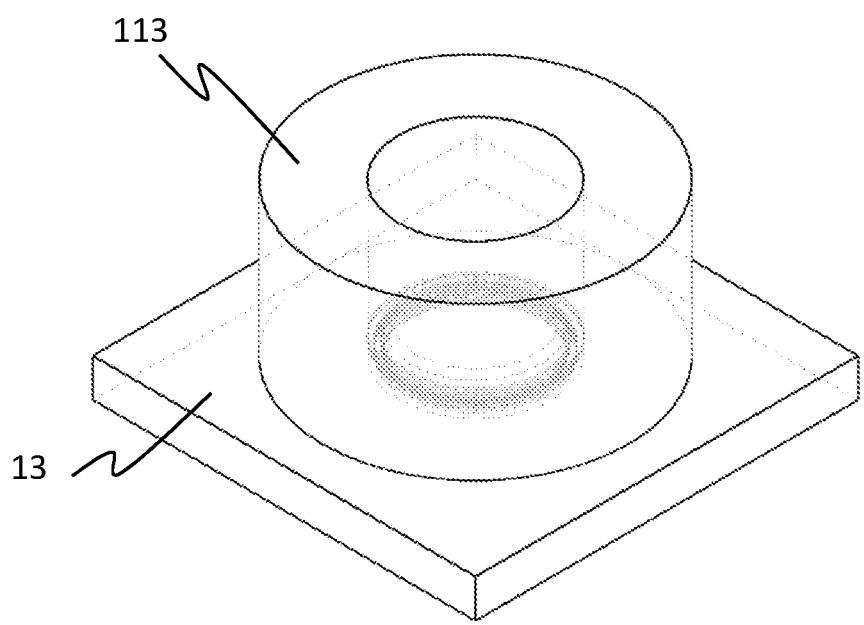
FIG. 7 shows a bottom section of the high-pressure piston-cylinder assembly as shown in FIG. 1A.

FIG. 7 shows a bottom section 113 being fixed on a base 13 in accordance with one embodiment. The bottom section may have a top end, a bottom end spaced apart longitudinally from the top end, and a cylindrical body connecting the top end and bottom end. Returning to FIG. 3, the bottom section 113 may have a thickness greater than the height of the cylindrical sealing block 131 such that the cylindrical sealing block 131 is completely and circumstantially surrounded by the bottom section 113 when the cylindrical sealing block 131 is fitted into the cylinder.

Figure 8A:
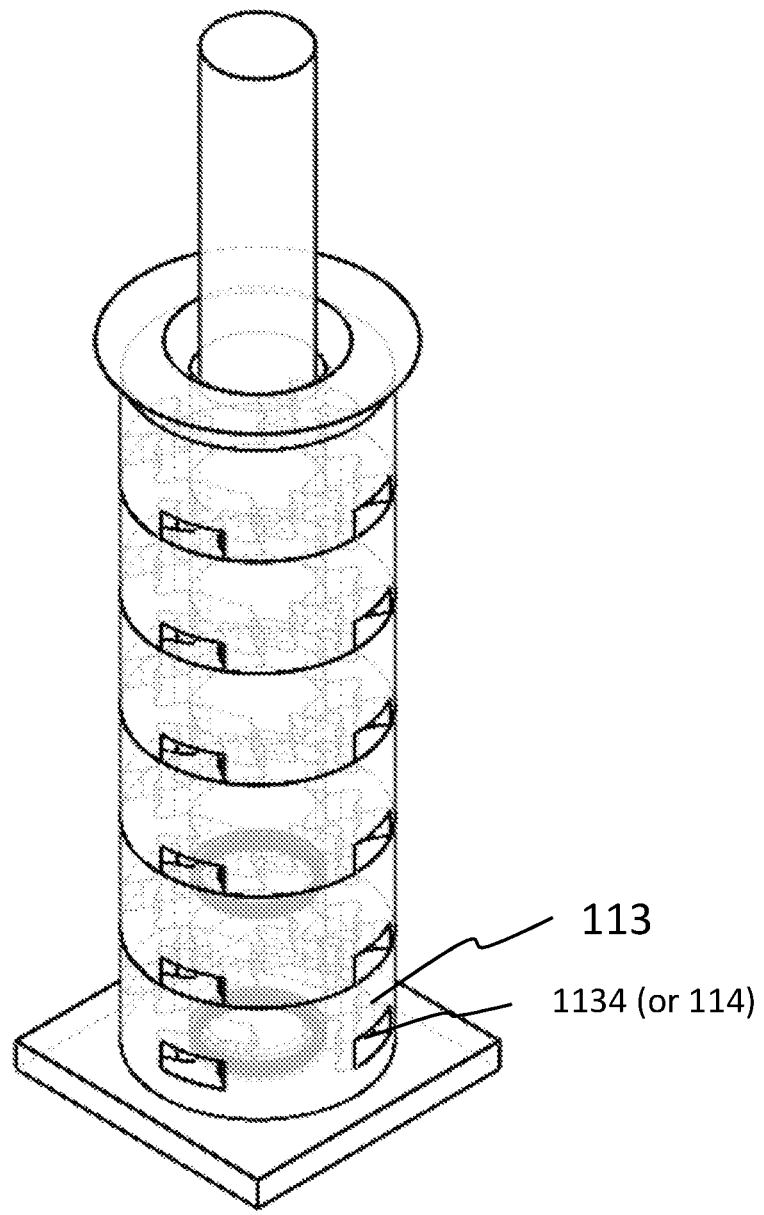
FIG. 8A shows an isometric view of a high-pressure piston-cylinder assembly for compaction treatment in accordance with another embodiment of the present invention.
Figure 8B:
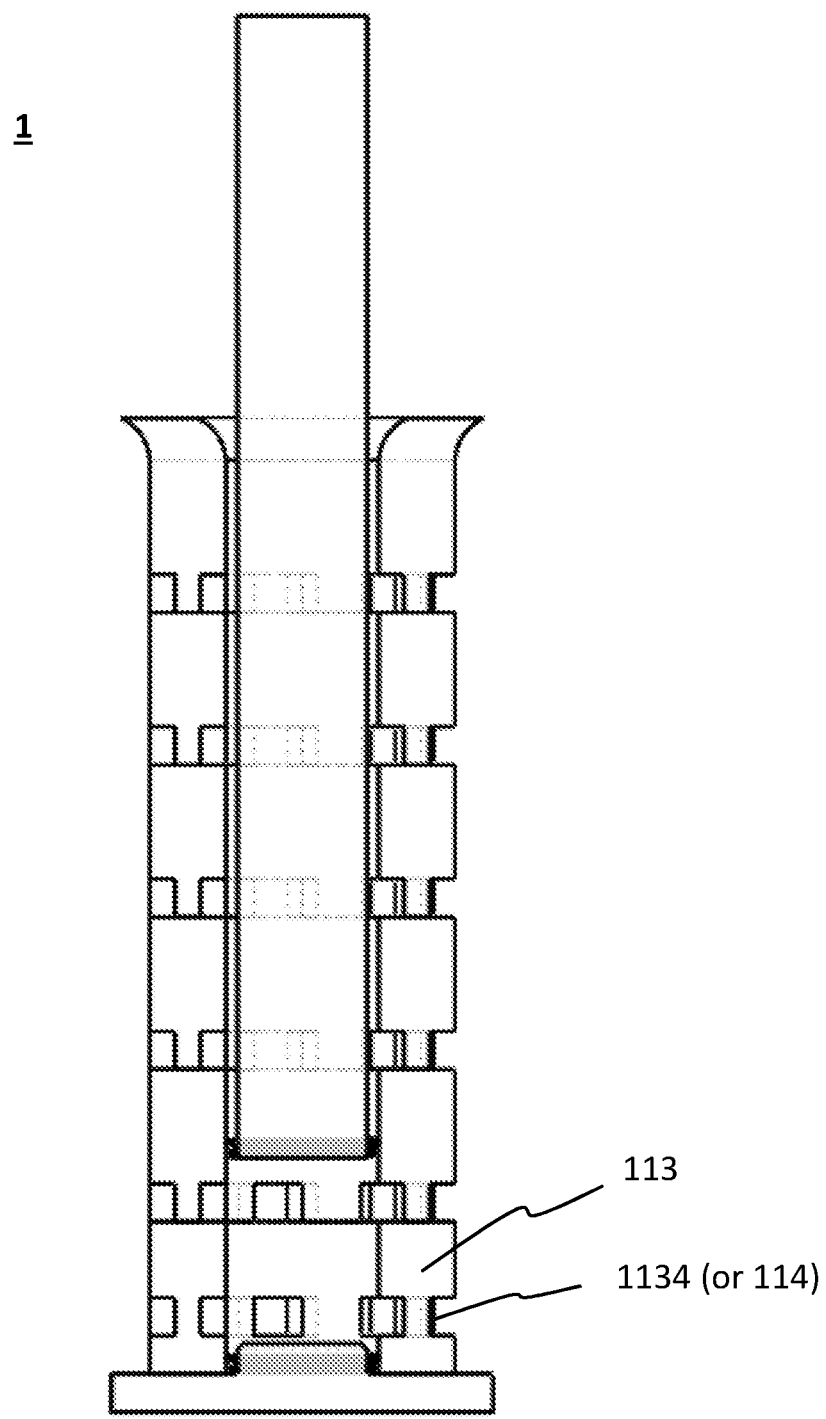
FIG. 8B shows a sectional view of the high-pressure piston-cylinder assembly as shown in FIG. 8A.

FIGS. 8A and 8B depict an isometric view and a sectional view, respectively, of a high-pressure piston-cylinder assembly 1 for compaction treatment in accordance with another embodiment of the present invention, wherein the bottom section 113 may further have one or more releasing channels 1134 (or 114) extending substantially along a radial direction. The releasing channels 1134 may have curved or straight paths.

Figure 9:
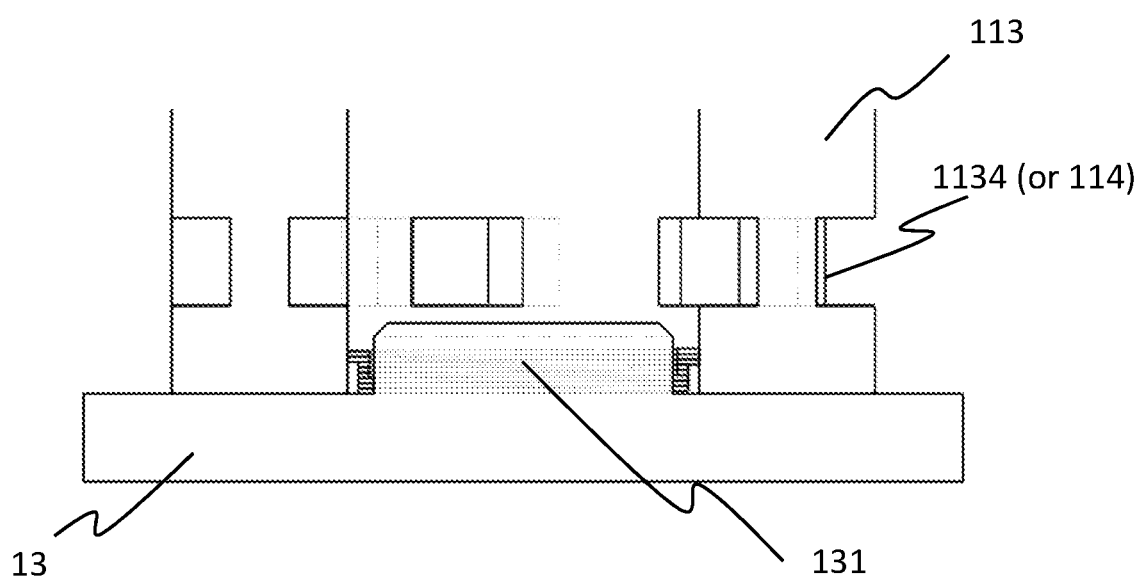
FIG. 9 shows a partial close-up view of the high-pressure piston-cylinder assembly illustrating a center of the base as shown in FIG. 8A.

As shown in FIG. 9, the releasing channels 1134 (or 114) of the bottom section are longitudinally spaced from the bottom end of the bottom section with a distance greater than a height of the cylindrical sealing block 131 of the base 13 such that the cylindrical sealing block 131 is completely and circumstantially surrounded by the bottom section 113 when the cylindrical sealing block 131 is fitted into the cylinder.

Figure 10:
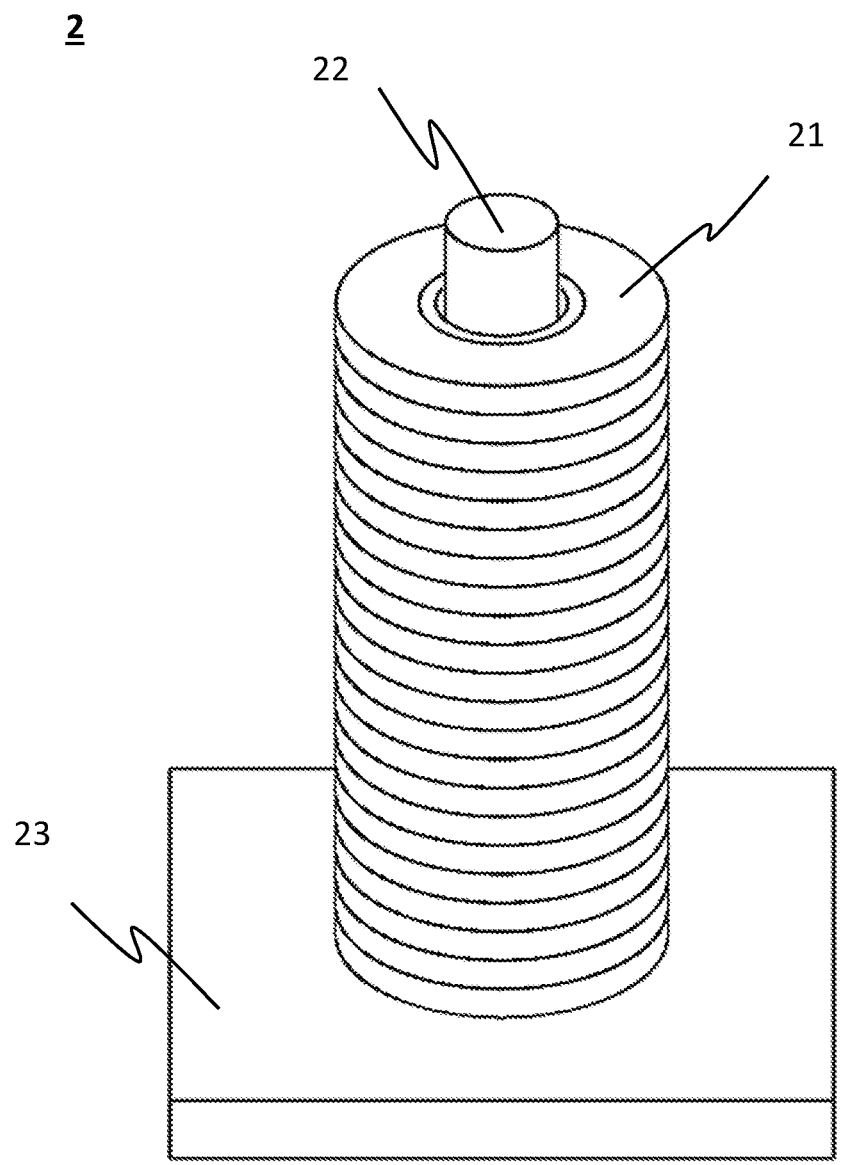
FIG. 10 shows an isometric view of a high-pressure piston-cylinder assembly in accordance with another embodiment of the present invention.
Figure 11:
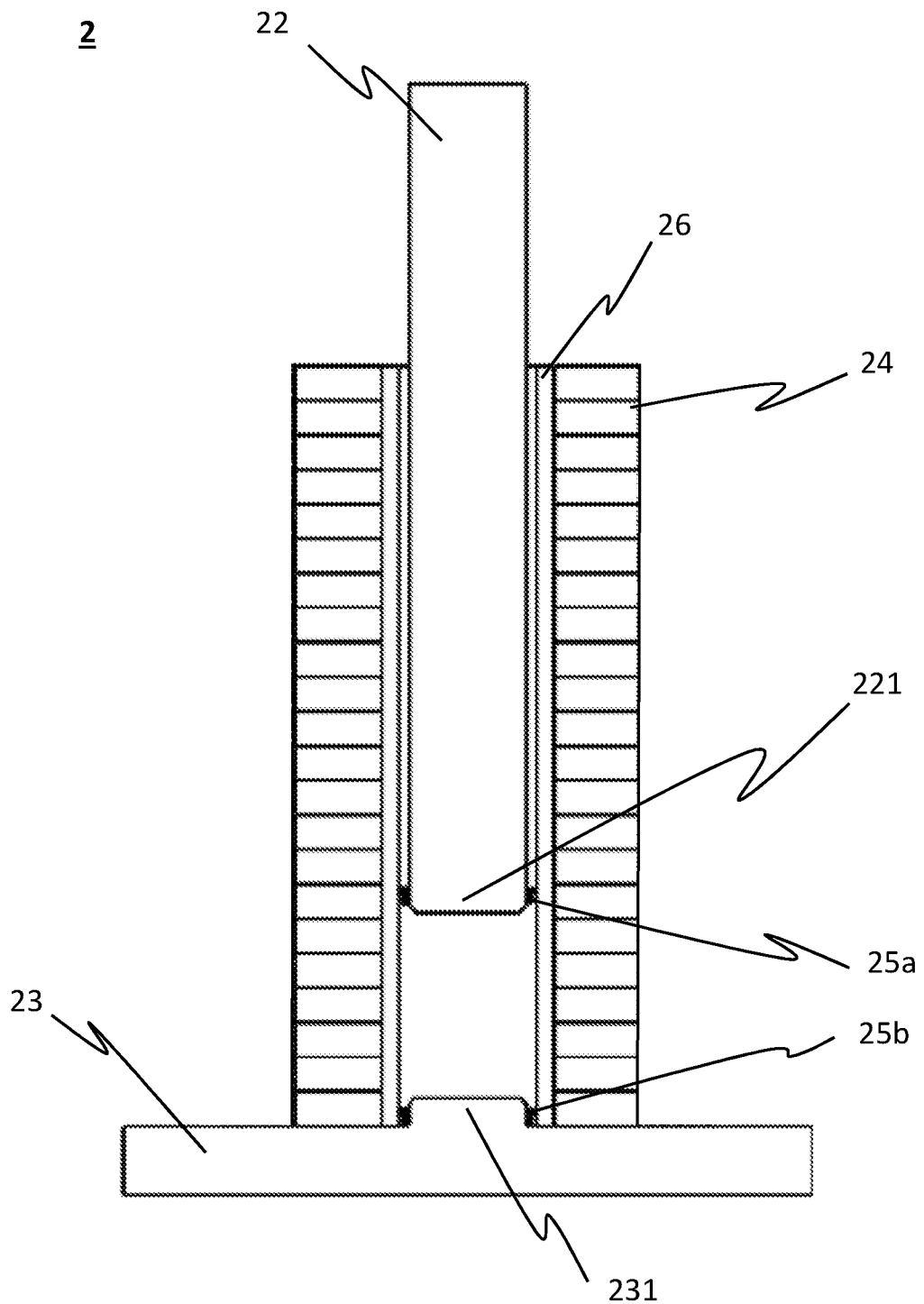
FIG. 11 shows a sectional view of the high-pressure piston-cylinder assembly as shown in FIG. 10.

FIGS. 10 and 11 depict an isometric view and a sectional view, respectively, of a high-pressure piston-cylinder assembly 2 in accordance with another embodiment of the present invention. As show in FIGS. 10 and 11, the piston-cylinder assembly 2 comprises a cylinder 21 comprising a cylindrical chamber 26; a piston 22 configured for moving in and along the cylinder 21; and a base 23 configured for being coupled with the cylinder to provide mechanical support to the cylinder 21.

The piston-cylinder assembly 2 may further comprise one or more cylinder-strengthening members 24 surrounding circumferentially at least a portion of the cylindrical chamber 26. Optionally, the cylinder-strengthening members 24 may be fixed to each other to form a unitary structure with one or more fixing members (not shown). The fixing members may include bolts configured for engaging with holes formed in each of the cylinder-strengthening members along a longitudinal direction, or metal frames configured to surrounding the cylinder-strengthening members 24 with screws.

Figure 12:
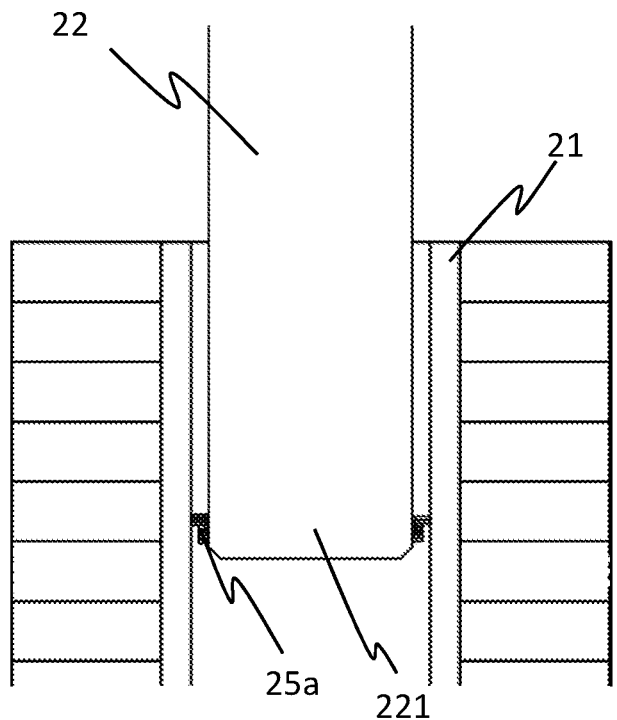
FIG. 12 shows a partial close-up view of the high-pressure piston-cylinder assembly of FIG. 10 illustrating a lower end of the piston.

FIG. 12 shows a partial close-up view of the high-pressure piston-cylinder assembly 2 illustrating a lower end of the piston 22. The piston 22 may have a piston sealing block 221 at its lower end and a first sealing member 25a configured to tightly encircle the piston sealing block 221 for providing sealing function to the piston-cylinder assembly.

Figure 13:
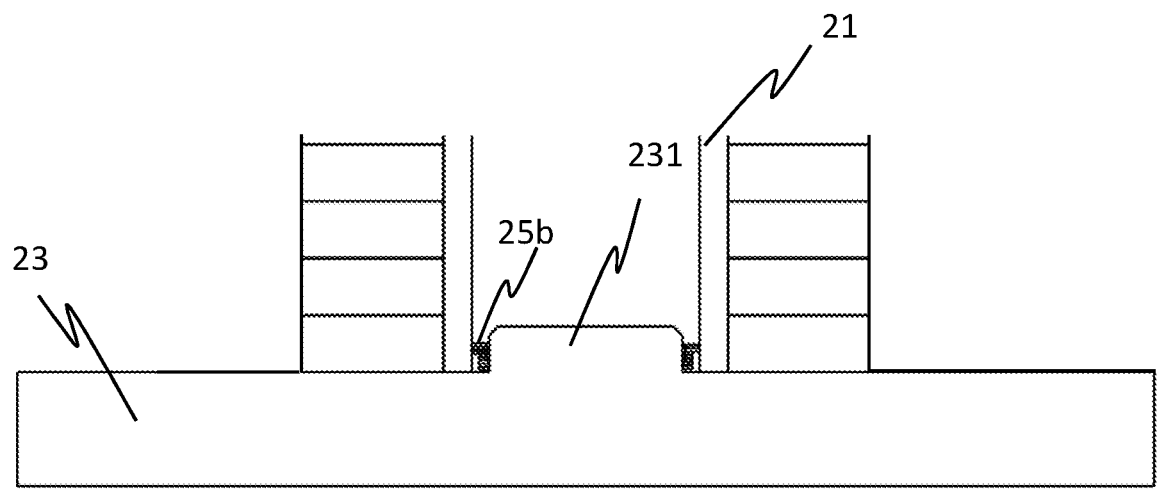
FIG. 13 shows a partial close-up view of the high-pressure piston-cylinder assembly of FIG. 10 illustrating a center of the base.

FIG. 13 shows a partial close-up view of the high-pressure piston-cylinder assembly 2 illustrating a center of the base 23. The base 23 may have a cylindrical sealing block 231 protruded from its center and a second sealing member 25b configured to tightly encircle the cylindrical sealing block 231 for providing sealing function to the piston-cylinder assembly.

Figure 14:
FIG. 14 shows one embodiment of a cylinder-strengthening member which is a solid ring.
Figure 15:
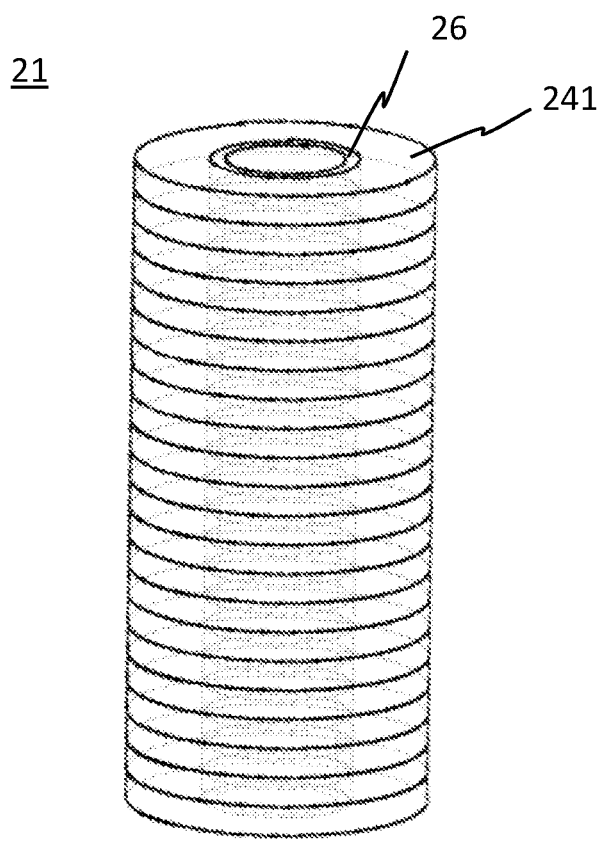
FIG. 15 shows a cylinder being circumferentially surrounded with a plurality of the cylinder-strengthening members of FIG. 14.

FIG. 14 shows one embodiment of the cylinder-strengthening member 24 which is a solid ring 241 and FIG. 15 shows a cylindrical chamber 26 being circumferentially surrounded with a plurality of the solid rings 241.

Figure 16:
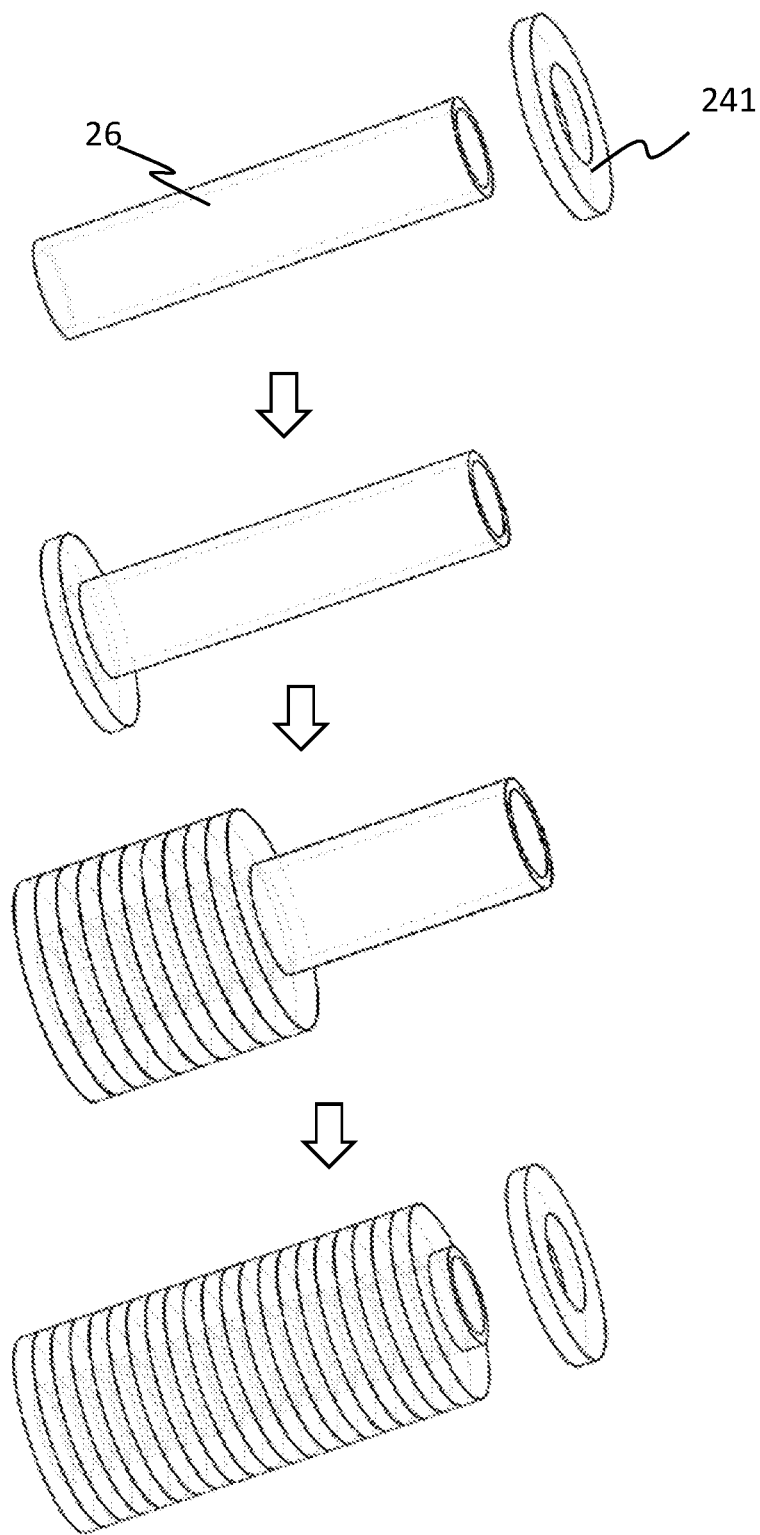
FIG. 16 shows how the cylinder-strengthening members as shown in FIG. 14 are assembled to the cylinder.

As shown in FIG. 16, the solid rings 241 may be assembled to the cylindrical chamber 26 one by one to encircle the cylinder and connected with each other to form a cylindrical unitary structure surrounding a portion of the cylinder 21. Alternatively, the solid rings 241 may be connected with each other to form a cylindrical unitary structure before being assembled to the cylindrical chamber 26 to encircle the cylinder circumstantially.

Figure 17:
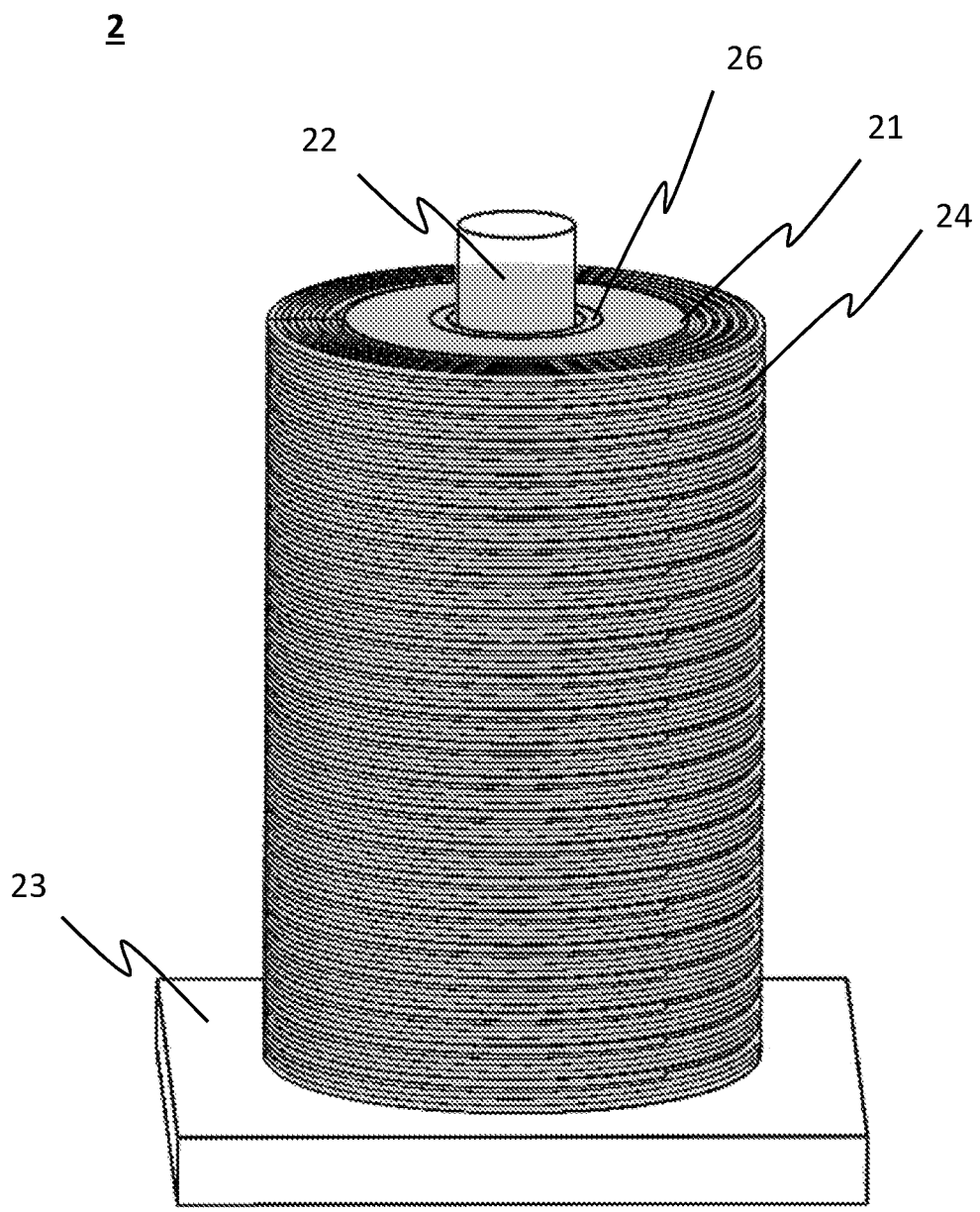
FIG. 17 shows an isometric view of a high-pressure piston-cylinder assembly in accordance with another embodiment of the present invention.
Figure 18:
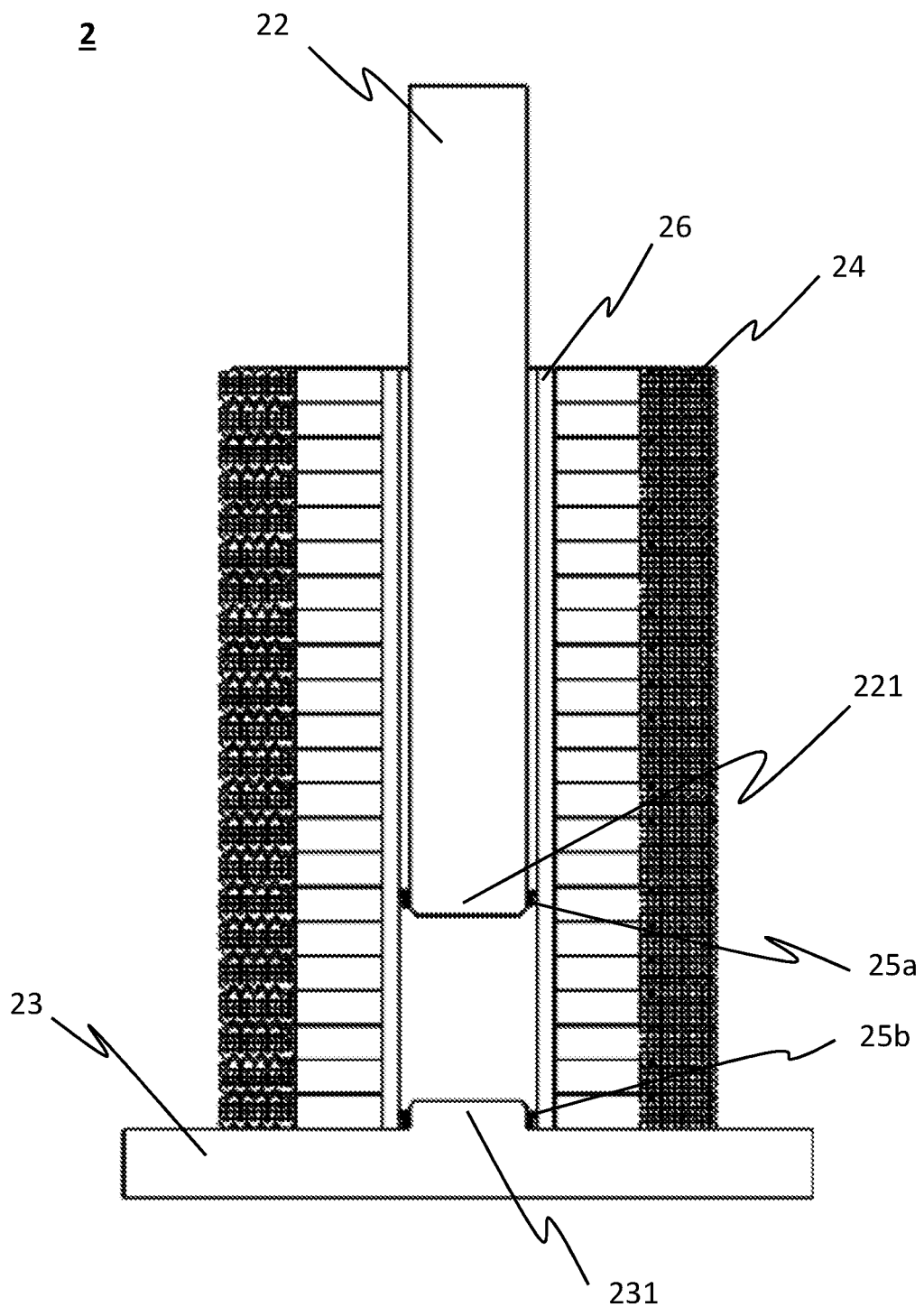
FIG. 18 shows a sectional view of the high-pressure piston-cylinder assembly as shown in FIG. 17.
Figure 19:
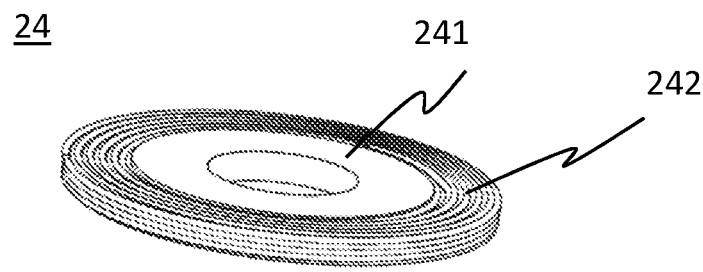
FIG. 19 shows another embodiment of the cylinder-strengthening member which is a sub-assembly of solid rings and coils of wires.

FIGS. 17 and 18 depict an isometric view and a sectional view, respectively, of the high-pressure piston-cylinder assembly 2 in accordance with another embodiment of the present invention, wherein the cylinder-strengthening member 24 is a sub-assembly of solid rings 241 and coils of wires 242 as show in FIG. 19.

Figure 20:
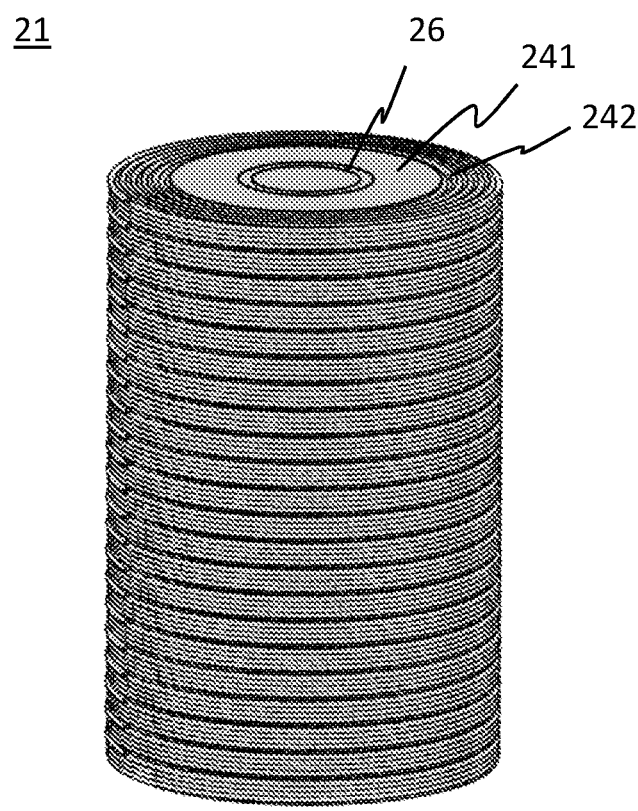
FIG. 20 shows a cylinder being circumferentially surrounded with a plurality of the cylinder-strengthening members of FIG. 19.

FIG. 20 shows a cylindrical chamber 26 being circumferentially surrounded with a plurality of the sub-assemblies of solid rings 241 and coils of wires 242. The implementation of coils of wires allows the use of less bulky solid rings to further improve the manufacturability of the cylinder as the size of the coil of wire can be adjusted in a very flexible manner according to various pressure tolerance requirements.

The solid ring 241 may have an inner diameter equal to an outer diameter of the cylinder and each solid ring 241 is encircled radially with a coil of wire 242 having a winding height equal to or smaller than a thickness of the solid ring 241. Preferably, the coil of wire 242 may comprise a plurality of concentric annular winding layers and each of the concentric annular winding layers is formed of at least one helically winded wire.

Figure 21:
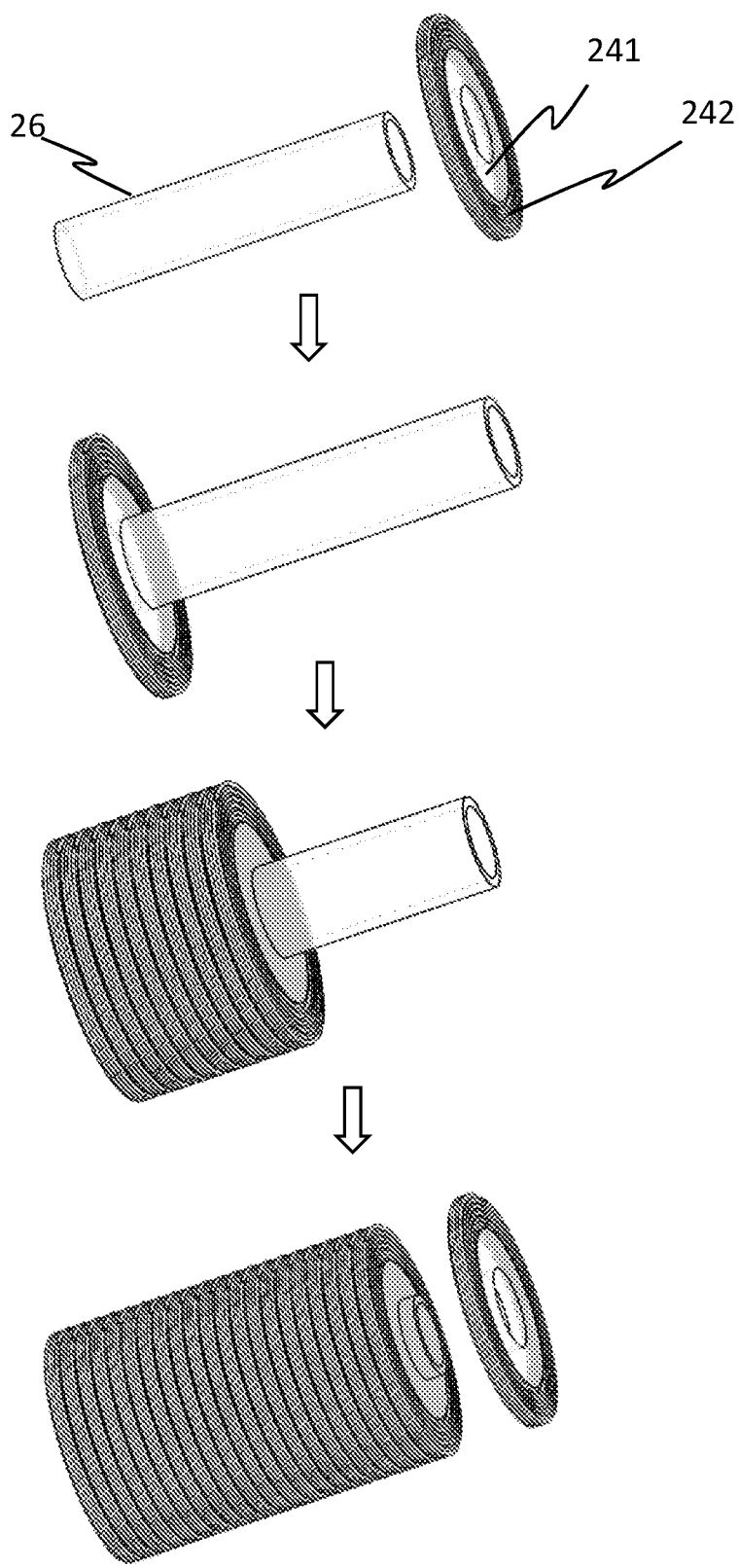
FIG. 21 shows how the cylinder-strengthening members of FIG. 19 are assembled to the cylinder.

As shown in FIG. 21, the sub-assemblies of solid rings 241 and coils of wires 242 may be assembled to the cylindrical chamber 26 one by one to encircle the cylinder and connected with each other to form a cylindrical unitary structure surrounding a portion of the cylindrical chamber 26.

Alternatively, the cylinder-strengthening member 24 may be connected with each other to form a cylindrical unitary structure before being assembled to the cylindrical chamber 26 to encircle the cylinder circumstantially.

Alternatively, the solid rings 241 may be assembled to the cylinder 21 one by one to encircle the cylinder and connected with each other to form a cylindrical unitary structure surrounding a portion of the cylinder. Then the coils of wires 242 may be assembled to cylindrical unitary structure to encircle the cylindrical unitary structure circumstantially.

In another embodiment, cylinder-strengthening members may include primary solid rings and secondary solid rings having inner diameters equal to outer diameters of the primary solid rings. The primary solid rings may be assembled to the cylindrical chamber 26 one by one to encircle the cylindrical chamber 26 and connected with each other to form a primary cylindrical unitary structure surrounding a portion of the cylindrical chamber 26. The primary cylindrical unitary structure may be further encircled with the secondary solid rings to form a multiple-layer cylindrical structure. Preferably, the secondary solid rings may be positioned longitudinally in an interdigital way with respect to the primary solid rings such that gaps formed between the primary solid rings can be covered and sealed by the secondary solid rings.

The solid rings may be made of steels, nickel-based alloys or other with high mechanical strength characteristics. As the size of solid rings can be much smaller compared with the size of the cylinder, they are much easier to be machines and handled, therefore the manufacturing costs of the overall assembly can be greatly reduced.

On the other hand, the coil of wires may be made of copper, phosphor bronze, or other alloys with high heat transfer characteristics such that the coils of wire may act as a heat sink for cooling down the piston-cylinder assembly.

In accordance to various embodiments of the present invention, each of the sealing members may be a coiled felt seal (CFS) formed by assembling a plurality of metal dynamic sealing rings which have a helical coiled sealing ring structure as disclosed in the PCT International Application No. PCT/CN2012/071634.

Figure 22:
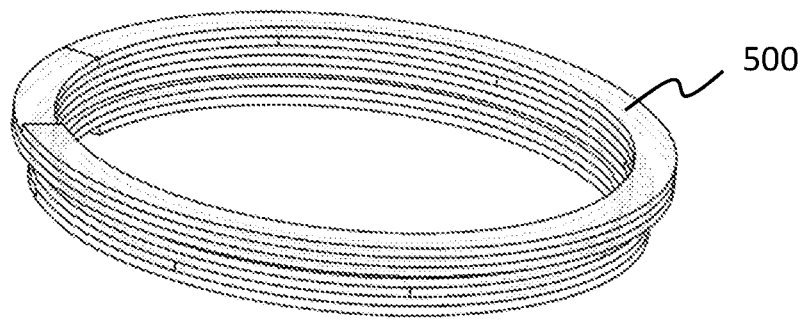
FIG. 22 shows an isometric view of a CFS in accordance with one embodiment of the present invention.
Figure 23:
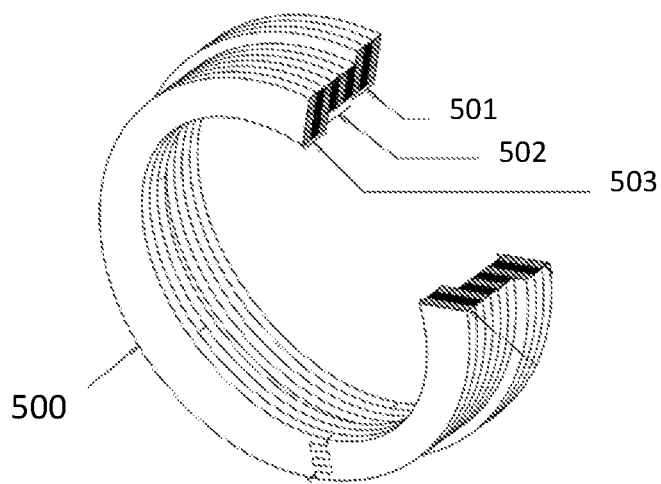
FIG. 23 shows a partial cutaway view of the CFS as shown in FIG. 22.
Figure 24A:
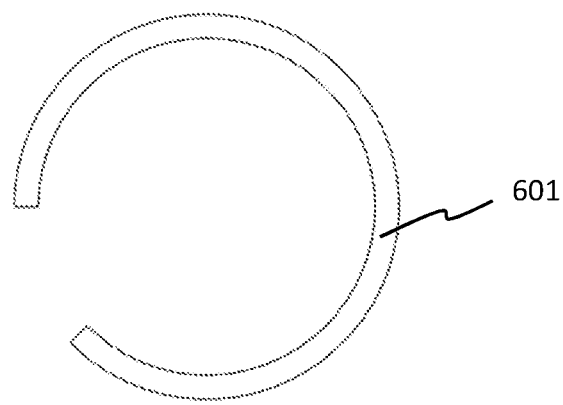
FIG. 24A shows a cylinder sealing ring in accordance with one embodiment of the present invention.
Figure 24B:
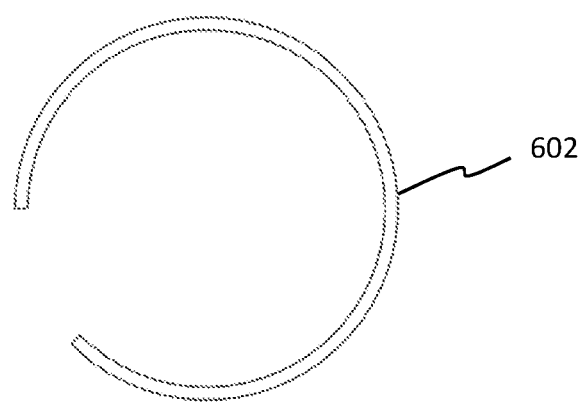
FIG. 24B shows a displacement absorption ring in accordance with one embodiment of the present invention.
Figure 24C:
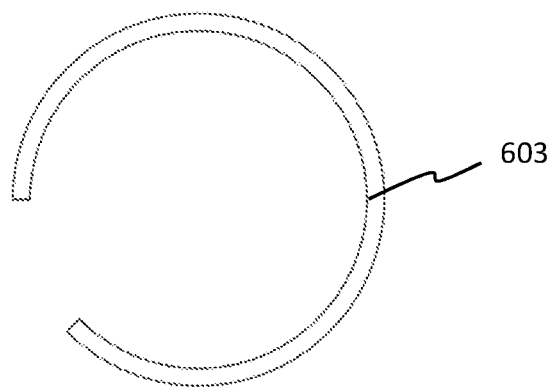
FIG. 24C shows a piston sealing ring in accordance with one embodiment of the present invention.

FIGS. 22 and 23 show an isometric view and a partial cutaway view, respectively, of a CFS 500 in accordance with one embodiment of the present invention. As shown in FIG. 23, the CFS 500 has three different functioned layers: cylinder seal layer 501, displacement absorption layer 502 and piston seal layer 503. The functional layers may be formed by groups of their corresponding basic source rings. FIGS. 24A-24C shows three types of C-shaped basic source rings: cylinder sealing rings 601 for forming the cylinder seal layer 501, displacement absorption rings 602 for forming the displacement absorption layer 502 and piston sealing rings 603 for forming the piston seal layer 503, respectively.

The function of the cylinder seal layer 501 is for blocking the leak between inside diameter of the cylinder 1 and CFS 500. The corresponding cylinder sealing rings 601 have outer diameter slightly bigger than the cylinder inner diameter so that they push against the cylinder interior wall from all directions to seal it, whilst their inner diameter is bigger than the piston diameter that they never touch the piston surface.

The displacement absorption layer 502 is built between the cylinder seal layer 501 and the piston seal layer 503 to absorb eccentric vibration of the piston and also absorbs the dimensional change of the whole system by wearing along with use. The corresponding displacement absorption rings have inner diameter bigger than the piston diameter so they never touch the piston surface, whilst their outer diameter is smaller than the cylinder inner diameter so that they never touch the cylinder interior wall.

The function of the piston seal layer is blocking the leak between outside diameter of the piston 22 and CFS 500. The corresponding piston sealing rings 603 have inner diameter slightly smaller than piston diameter so that they can encircle tightly around the piston sealing block surface and seal it, whilst their outer diameter is sharing the same outer diameter of the displacement absorption rings, which is smaller than the cylinder inner diameter such that they never touch the cylinder interior wall.

The displacement absorption rings of the CFS allow big tolerance of misalignments in the piston-cylinder assembly because the rings in this section are movable in the latitudinal directions, swinging around to absorb vibrations and lateral movements caused by the misalignments between the piston and the cylinder under high speed up-down stroke motion. As such, the presence of the displacement absorption section ring in the CFS also reduces the unwanted torque due to misalignment among the center of the piston.

Figure 25:
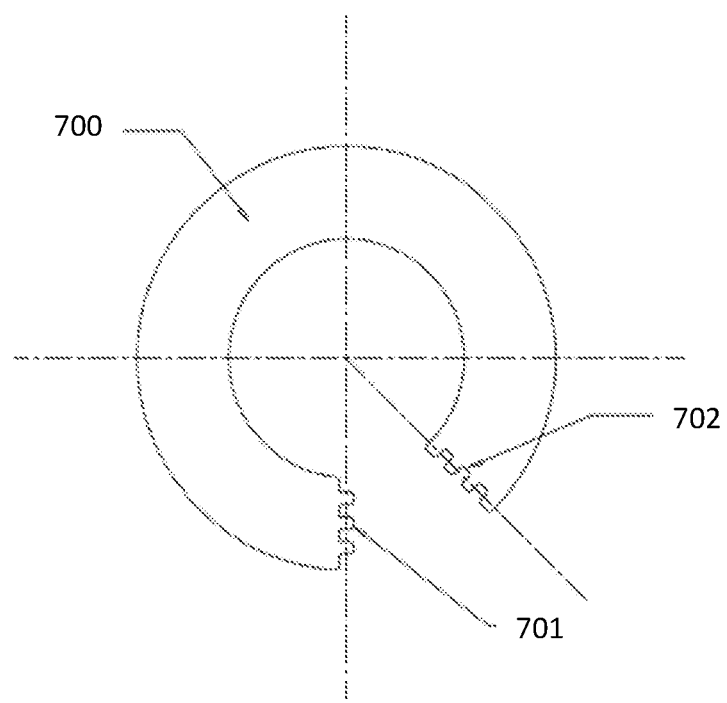
FIG. 25 shows a C-shaped basic source ring in accordance to one embodiment of the present invention.

FIG. 25 shows a C-shaped basic source ring 700 which is a partial ring with a pair of male dovetail 701 and female dovetail 702 in accordance to one embodiment of the present invention. The C-shaped ring may be stamped out by press or fabricated by contour cutting process such as laser cutting or wire cutting from sheet stock to have two faces in perfect parallel. As shown in FIG. 25, the C-shaped basic source ring 700 is a partial ring that made to have a part of the ring cut away so as to make the partial rings be progressively joined by the male dovetail 701 and female dovetail 702 made on two ends of the partial ring. The value of the cut away angle should be determined accordingly along with diameter.

Figure 26:
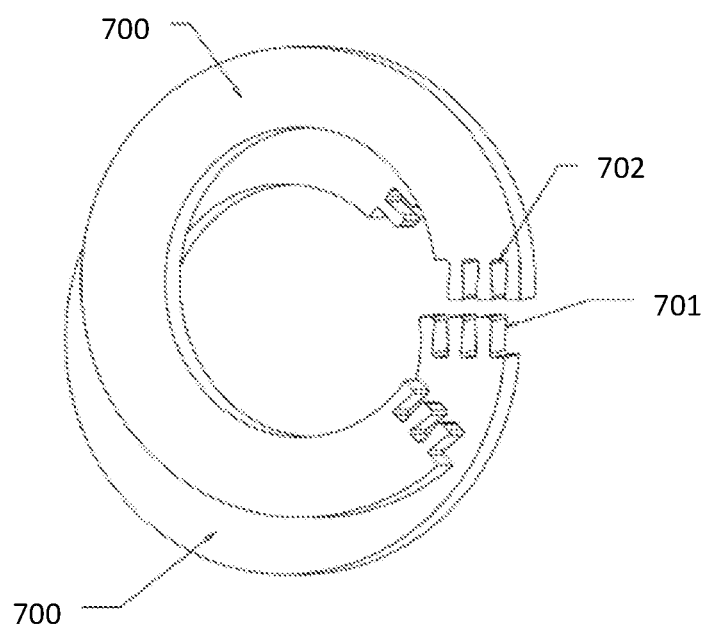
FIG. 26 shows a method of progressive joining of two C-shaped basic source rings in accordance to one embodiment of the present invention.

FIG. 26 shows the method of progressive joining of two C-shaped basic source rings 700 by the male dovetail 701 of first partial ring 700 and female dovetail 702 of next partial ring 700.

Because each C-shaped ring is only a partial circle, in order to provide effective sealing function, a minimum of two piston sealing rings, a minimum number of two-cylinder sealing rings and at least one displacement absorption ring are needed to form a complete CFS.

The helical coiled sealing ring structure of the CFS can assure perfect sealing performance. It allows the CFS to contract when the piston sealing block is travelling towards the upper end or lower end of the cylinder and dilate when the piston sealing block is travelling through the middle section of cylinder. Therefore, the tight contact between the CFS and the cylinder interior wall can be sustained during the up-down strokes of the piston in the cylinder and leakage can be reduced to zero or close to zero.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A high-pressure piston-cylinder assembly, comprising:
a cylinder comprising a cylindrical chamber and two or more sections which are longitudinally stacked and joined to form the cylinder that surrounds circumferentially at least a portion of the cylindrical chamber;
a piston configured for moving in and along a longitudinal axis of the cylinder; and
a base configured for being coupled with the cylinder to provide mechanical support to the cylinder;
wherein the piston comprises a piston sealing block at a lower end of the piston and a first sealing member configured to tightly encircle the piston sealing block for providing sealing function to the piston-cylinder assembly;
wherein the base has a cylindrical sealing block protruded from the base and a second sealing member configured to tightly encircle the cylindrical sealing block for providing sealing function to the piston-cylinder assembly; and
wherein each of the sections includes one or more releasing channels extending radially from the longitudinal axis and along a radial direction through the cylinder for releasing of liquid or gas fluid generated during compaction treatment.

2. The high-pressure piston-cylinder assembly of claim 1, wherein the cylinder further comprises an opening which is rounded or chamfered for allowing smooth insertion of the piston sealing block.

3. The high-pressure piston-cylinder assembly of claim 1, wherein the first sealing member having a helical coiled sealing ring structure.

4. The high-pressure piston-cylinder assembly of claim 1, wherein the second sealing member having a helical coiled sealing ring structure.

5. The high-pressure piston-cylinder assembly of claim 1, wherein each of the two or more sections comprises a solid ring having an inner diameter equal to an outer diameter of the cylindrical chamber.

6. The high-pressure piston-cylinder assembly of claim 5, wherein each of the two or more sections further comprises a coil of wire having a winding height equal to or smaller than a thickness of the solid ring; and the solid ring is encircled radially with a coil of wire having a winding height equal to or smaller than a thickness of the solid ring.

7. The high-pressure piston-cylinder assembly of claim 6, wherein the coil of wire comprises a plurality of concentric annular winding layers.

8. The high-pressure piston-cylinder assembly of claim 7, wherein each of the concentric annular winding layers is formed of at least one helically winded wire.

9. The high-pressure piston-cylinder assembly of claim 1, wherein the two or more sections comprises primary solid rings having inner diameters equal to an outer diameter of the cylindrical chamber and secondary solid rings having inner diameters equal to outer diameters of the primary solid rings;

wherein the primary solid rings are assembled to the cylindrical chamber one by one to encircle the cylindrical chamber and connected with each other to form a primary cylindrical unitary structure surrounding a portion of the cylindrical chamber; and the primary cylindrical unitary structure is encircled with the secondary solid rings to form a multiple-layer cylindrical structure; wherein the secondary solid rings are positioned longitudinally in an interdigital way with respect to the primary solid rings such that gaps formed between the primary solid rings are covered and sealed by the secondary solid rings.

\* \* \* \* \*